UNITED STATES PATENT OFFICE.

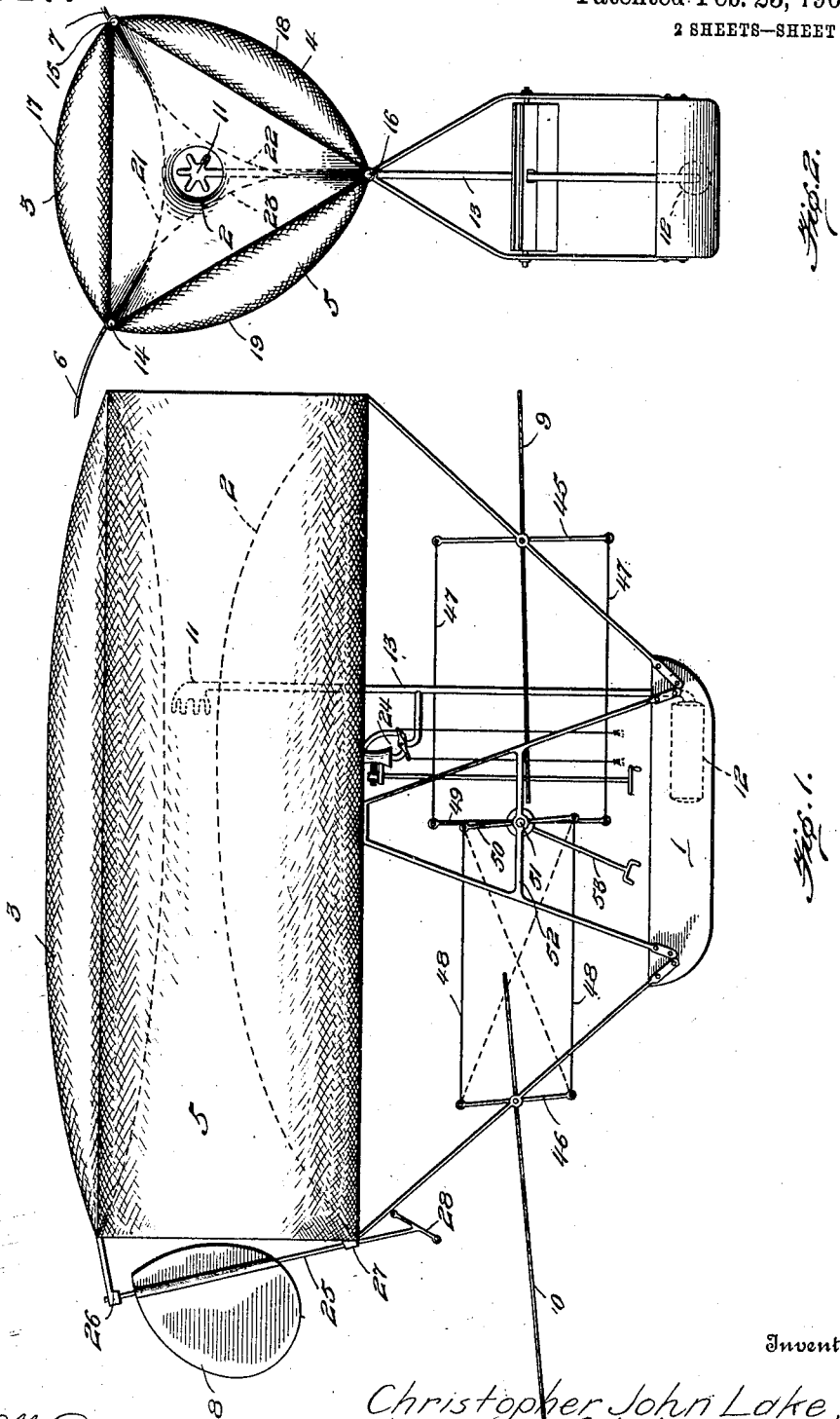

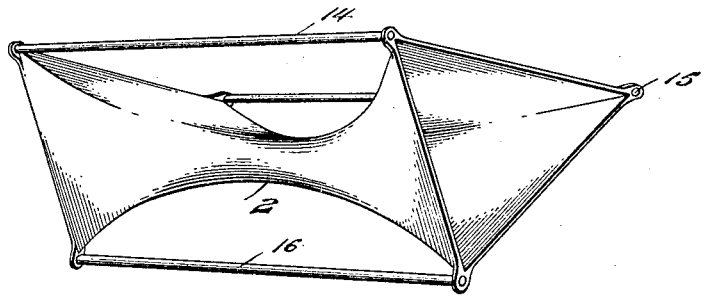
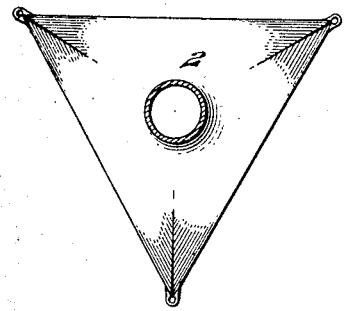
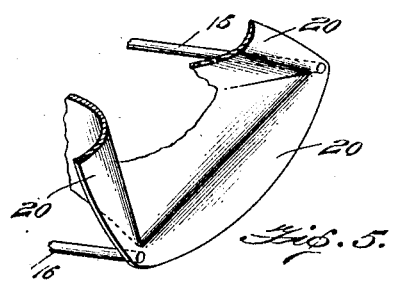
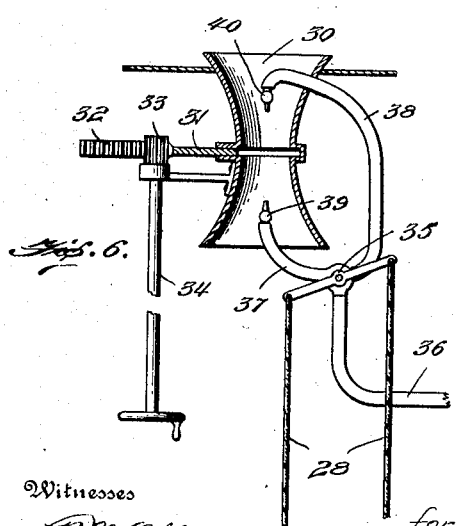

CHRISTOPHER JOHN LAKE, (NAME CHANGED FROM JOHN CHRISTOPHER LAKE BY JUDICIAL ORDER,) OF BRIDGEPORT, CONNECTICUT, AND SPENCER HEATH, OF WASHINGTON, DISTRICT OF COLUMBIA; SAID HEATH ASSIGNOR TO SAID LAKE.

AERIAL VESSEL.

No. 913,517.     Specification of Letters Patent.     Patented Feb. 23, 1909.

Application filed August 27, 1907. Serial No. 390,390.

*To all whom it may concern:*

Be it known that we, CHRISTOPHER JOHN LAKE, (formerly JOHN CHRISTOPHER LAKE,) and SPENCER HEATH, citizens of the United States of America, residing, respectively, in Bridgeport, in the county of Fairfield and State of Connecticut, and in Washington, District of Columbia, have invented certain Improvements in Aerial Vessels, of which the following is a specification.

This invention relates to improvements in the means of aerial navigation and has particular reference to the problem of controlling and maintaining the buoyancy and stability of vessels used for that purpose.

One object of the invention is to construct an aerial vessel which may be sustained either wholly or partly by a buoyant element confined within a structure in which the forward portions which are exposed to wind pressure will have such form and rigidity as to admit of great velocity of travel without danger to the balloon structure. This object is attained by disposing the buoyant element about a tubular propelling device having enlarged ends of rigid construction.

A further object is to produce an aerial vessel having as one of its means of support a buoyant element confined within an envelop provided with means whereby it may be inflated or deflated as desired, according to the requirements of starting or landing and according to the amount of buoyancy required when the vessel is in part sustained by the air impact on aeroplanes or other sustaining surfaces of the vessel as high speed is attained.

A further object is to produce an aerial vessel that will be sustained by a combination system of aeroplanes and a buoyant element and in which the aeroplanes will be so disposed as to form flexible walls within which to confine the buoyant element.

A further object is to provide means independent of the buoyant element for causing the vessel to ascend or descend when in motion and for changing the inclination of the vessel and for maintaining it in an inclined or horizontal position as desired, whether ascending or descending.

A further object is to provide the vessel with a steering apparatus so constructed as to prevent descent of the vessel when its speed is slackened by the rudder action.

With these objects in view and further objects which will appear as the nature and advantages of the invention are more fully disclosed, we have produced the various devices and combination of parts hereinafter specifically described and claimed and illustrated by the accompanying drawings which form a part of this specification, and in which:

Figure 1 is a side elevation of an aerial vessel embodying the various features of our invention. Fig. 2 is an end elevation of Fig. 1. Fig. 3 is a detail perspective view of the tubular propelling portion with the inclosing planes removed. Fig. 4 is a transverse section through the central portion of Fig. 3. Fig. 5 is a part perspective view of the tubular propelling portion showing a modification of its forward portion. Fig. 6 is an enlarged detail view of the apparatus for inflating and deflating the walls which envelop the buoyant element. Fig. 7 is an enlarged detail view of the plane-controlling mechanism shown in Fig. 1.

Similar reference characters are employed to designate corresponding parts throughout the several views.

The vessel comprises a basket or car 1, a tubular propelling device 2 having enlarged triangular ends, a system of three rectangular aeroplanes 3, 4 and 5, disposed about the tubular portion, a pair of auxiliary aeroplanes 6 and 7 (shown only in Fig. 2) and steering and controlling devices comprising the vertical rudder 8, the horizontal planes or rudders 9 and 10, and mechanism for operating and controlling the various parts of the vessel.

The tubular propelling apparatus 2 is constructed of thin metal or other rigid material and the vessel is propelled by discharging a heated elastic fluid from a projector situated in the constricted central portion of the tubular structure. For this purpose a heated gaseous fluid is conducted from the tank or generator 12 (shown by dotted lines) by way of the pipe 13 to the projector.

The tank or generator 12 may be of any form or variety adapted to furnish or produce sufficient quantities of heated gas or elastic vapor under pressure. The preferred generator, however, is one that produces a composite power fluid consisting of hydrocarbon gas, water vapor and highly heated air, the two latter elements being brought to a high degree of heat and pressure in a chamber surrounding an inner cylinder in which the hydrocarbon gas is produced by explosions and being mingled with that gas as the product of the generator.

The fluid discharged from the projector 11 draws a current of atmosphere through the tubular structure from front to rear, thereby removing the forward air resistance and moving the vessel by the reaction of the large volume of air mingled with and heated by the fluid from the projector and expelled at the rear. Some of the heat of the elastic fluid passes through the walls of the tubular structure and aids in maintaining the temperature of the buoyant element which surrounds the tubular structure as will presently be more fully explained. This surrounding buoyant element has, in turn, the reciprocal effect of preventing undue loss of heat from the exterior walls of the tubular structure. The mid-portions of the tubular structure may be circular in form as shown by Fig. 2 and Fig. 6 or it may be triangular to correspond with the end openings which, in either case, are made triangular to afford convenient attachment for the ends of planes 3, 4 and 5. These planes serve the two-fold purpose of air-impinging surfaces and walls for inclosing the buoyant element. Their sides are secured to longitudinal bars 14, 15 and 16, the ends of which are secured to corresponding corners of the two triangular ends of the tubular structure. The planes 6 and 7 are secured in any convenient manner to the upper bars 14 and 15. These bars may be round or of any preferred section or they may be constructed as trusses, their framework covered with fabric then constituting the planes 6 and 7. The planes 3, 4 and 5 which form also the inclosing walls for the buoyant element about the tubular structure have normally flat or somewhat dished surfaces, but when inflated they will take the convex form shown in the drawings and indicated by the lines 17, 18 and 19, and when deflated they will conform to the concave lines 21, 22 and 23. By inflation and deflation the fabric can, of course, be given any form intermediate these extremes, according to the amount of buoyancy and the form of air surfaces desired, and the fabric may be of material that will remain taut for all degrees of inflation or of material that is only slightly elastic and will conform smoothly only to the outer or inner lines. Independently of their function as an inclosure for the buoyant element these planes serve also as air-impinging surfaces to aid in sustaining or directing the vessel during flight and in case of puncture the two lower ones will take the concave form shown at 22 and 23 thus forming, together with planes 6 and 7, very effective air resisting surfaces to prevent too rapid descent. In case of extended tearing or destruction of either or both the lower planes the pressure of air below will distend the upper plane 3 to its convex form 17, thus forming an additional parachute in such an emergency. The planes 3, 4 and 5, when flat or deflated are protected from forward wind pressure by the rigid walls of the tubular portion. When inflated their convex surfaces may be exposed to the forward wind pressure or the forward walls of the tubular portion may be extended as shown at 20 in Fig. 5 to form wind shields to protect the flexible fabric of the inclosing planes.

The space for the buoyant element between the tubular propelling structure 2 and the inclosing planes 3, 4 and 5 is filled with heated air and gas by means of the jet blower 24 (Fig. 1), shown in detail by Fig. 6. The double-acting nozzle-casing 30 provided at its mid-length with the cut-off valve or gate 31 is secured in an aperture between the two lower inclosing planes. The gate 31 is operated through the rack 32 and pinion 33 by turning the shaft or handle 34. A heated elastic gas or vapor is conducted from a source of supply, which may be the same as that used for propelling the vessel, to a three-way cock 35 by means of the pipe 36. This three-way cock is operated from the car or basket by means of the cords 28. From the three-way cock branch pipes 37 and 38 extend. Pipe 37 terminates in the nozzle 39 in the outer portion of the nozzle casing 30. For inflation the valve or gate 31 is opened as shown and the three-way cock 35 turned so as to allow the escape of a jet of heated gas or vapor through the branch pipe 37 and nozzle 39. The fluid thus escaping will pass to the interior of the balloon-space drawing with it and heating a relatively large portion of atmospheric air. This jet-blower device furnishes a convenient method of heating the air while forcing it in and also provides a feature of safety against overstraining the inclosing walls, the nozzle 39 being so situated with reference to its casing 30 that when the interior pressure reaches a certain point no more atmosphere will be drawn in through the casing, but if the jet of heated gas is continued it will pass alone through the casing and a corresponding amount of the colder and denser air near the casing will pass out in the reverse direction. While the colder and heavier air thus passes out from the lower portion of the inclosed space the warmer and rarer air in the upper portion will be still further heated by admixture with the incoming jet of heated gas. By this means the heat of the buoyant element is adequately maintained or augmented by simply continuing or resuming the process of inflation.

For deflation the three-way cock 35 is turned so that the heated gas will flow through the branch pipe 38 and issue downwardly from the nozzle 40 in a jet opposite to the corresponding nozzle on pipe 37. This jet, by an action similar to but reverse from that of inflation just described, will cause the contents to pass out through the nozzle-casing, thus causing deflation. Here again a similar feature of safety removes danger of overstraining the structure by vacuum, as, beyond a certain point of rarefaction, which may be well within the limits of safety, the contents will not be further drawn out by the action of the jet, but if allowed to continue the heated gas will simply escape from the nozzle into the open air. When the desired extent of deflation or degree of vacuum has been produced the cock 35 is turned off and the gate 31 immediately closed to prevent any inrush of air.

The forward and aft horizontally pivoted planes or rudders 9 and 10 are used to give vertical control and as an aid in sustaining the vessel. These rudders are secured in the frame-work intermediate the propelling and sustaining apparatus and the car or basket, but they may be placed in any preferred position with reference to the other parts of the vessel. These rudders are each provided with an arm or double lever 45 and 46 from the extremities of which operating cords or wires 47 and 48 are attached. These cords or wires connect with similar levers 49 and 50 mounted on a horizontal shaft 51 intermediate and parallel to the two rudder shafts.

The cords or wires may be parallel to each other as shown or one pair of them may be crossed as indicated by the diagonal dotted lines in connection with rudder 10. The horizontal shaft 51 is secured at each end in the bars 52 of the frame-work that supports the basket. From this shaft depends an arm 53 which is so connected with the levers 49 and 50 that they may be all rotated together about the shaft 51. It is now apparent that the rudders 9 and 10 when connected by cords or wires as shown by the full lines may be operated together by swinging the arm 53 in such manner that the vessel may be caused to ascend or descend while in motion without necessarily departing from a horizontal position. It is likewise plain that if the cords or wires 48 be crossed as shown by the dotted lines the rudders will act oppositely when operated in the same way by the arm 53 and will have the effect of changing the inclination of the entire vessel in ascending or descending. The principle of this latter arrangement of oppositely acting rudders is believed not to be new, and the principle of rudders acting together so as to maintain the vessel in a horizontal position or at any given inclination, whether ascending or descending, has been claimed in pending application for Letters Patent No. 374,996, filed May 22, 1907. It is of great advantage, however, to have the rudders and their operating mechanism so contrived that they may be operated either together or oppositely or in any gradation of manner between these two methods, thus giving the operator a far more perfect and flexible control of the vessel. This result is accomplished by means of the differential controlling device which is drawn to a larger scale in Fig. 7. The double levers 49 and 50 are each connected integrally with bevel gears 55 and 56. These gears fit freely on the shaft 51 and are kept from lateral displacement by the collars 57 and 58. Between the gears on shaft 51 there is a free-fitting collar 59 having an integrally connected rod 60 projecting radially from its central portion. The rod 60 carries a sleeve which forms the arm 53 the upper end of which carries a pinion 61 engaging the gears 55 and 56. The pinion 61 is secured in mesh with the gears by means of a nut 62 on the extremity of the rod 60 where it projects from the end of the sleeve forming the arm 53. This arm is provided with a cross bar 54 bent to form convenient handles 65 to be grasped by the operator. It will now be seen that any swinging motion of the arm 53 will cause the levers 29 and 30 to act together and impart to the rudders a parallel motion if the connecting cords or wires are parallel as shown by full lines in Fig. 1, or an opposite motion if one of the pairs of cords or wires are crossed as indicated by the diagonal dotted lines. It is also apparent that by giving the arm 53 a rotative motion about its own axis the levers 49 and 50 will act oppositely with respect to each other and will give the rudders an action contrary to that given by swinging the arm. It is obvious that both the swinging and rotative motions can be given the arm 53 at the same time so as to give the rudders a combination action. In this way either action of the rudders may be modified and regulated to a nicety by combining with it somewhat of the other action.

The vertical rudder 8 affords means for steering the vessel in lateral directions. This rudder swings on the shaft 25 which is supported with a rearward inclination in the bearings 26 and 27. The purpose of this rearward inclination of the shaft 25 is to depress somewhat the after portion of the vessel when the rudder is swung athwart its direction of travel. The effect of turning any rudder is to check somewhat the speed of the vessel, and in any vessel sustained partly or wholly by air-impinging planes or surfaces any check on the speed lessens the upward air pressure and causes the vessel to descend, unless there is a simultaneous change in the inclination of the air-impinging surfaces. By placing the axis of the rudder in an inclined position as shown any swing of the rudder produces a downward as well as a lateral displacement of the after portion of the vessel and all tendency to descend because of the slackened speed is then overcome by the air impinging at an increased angle on the planes or other sustaining surfaces. This rudder may be operated in any ordinary manner as by wires or cords attached to the ends of the T-arm 28 on the shaft 25, no special mode of operating this rudder being included as a part of the present invention.

The advantages of an aerial vessel constructed in accordance with the foregoing description are readily apparent. The danger of collapse attendant upon driving the known forms of buoyant vessels at high speed or against the wind is well known and obvious. In the vessel described the effect of wind resistance is largely overcome owing to its peculiar propelling arrangement by which the air is removed from in front of the vessel and caused to pass out at the rear. The structure is such, however, that unless the inclosing planes 3, 4 and 5 are fully inflated practically all of the forward air pressure is met by the rigid walls of the tubular propelling portion, which by their peculiar form and construction are adapted to withstand it. When the inclosing planes are fully inflated some of the forward air pressure will bear against their projecting convex walls. This may be prevented by extending the forward edges of the tubular portion to form wind shields beyond the line of attachment of the flexible walls as shown at 20 in Fig. 5. These walls may yield, however, without danger to the structure as some of the buoyant element can freely pass out through the nozzle casing 30. The loss of buoyancy thus produced is partly or wholly compensated by the upward effect of the air pressure on the two lower planes 4 and 5 which would receive a greater air impact than the top plane 3 owing to the normal inclination of the vessel. When the air-impinging surfaces are made of sufficient size and high propelling power is used it is, in fact, not necessary to use the buoyant element while the vessel is under way, but this reserve buoyancy may be used for hovering or remaining neutral in the air, which is especially desirable for military purposes, or it may be used as an aid in starting or rising or to effect safe and gentle landings by descending vertically or with very moderate horizontal speed.

The novel method of inflating and deflating and of heating the buoyant element is another feature of great advantage. The fatal defect of nearly all buoyant vessels is their inability to rise without discharge of ballast or to descend without the escape of gas, neither of which when once lost can be regained. By the use of its inflating and deflating and heating apparatus the vessel described becomes independent of ballast and has a range of travel limited only by the amount of fuel and gas-producing materials that it can carry. Apart from the purpose of propulsion the gas generating mechanism need be of but comparatively small capacity, it being the heat from the generator used to warm the buoyant air that is relied upon rather than any buoyant properties of the gas itself. A further economy results from the fact that when part of the buoyant element is passed off by deflation it is only the colder and denser atmosphere from the bottom of its inclosure that is lost. The advantages of the controlling device for the horizontal gliding and balancing planes or rudders and of the rearwardly inclined axis of the vertical rudder have been set forth with sufficient particularity in connection with the description of them.

Having fully described one form of apparatus in which the principles of the present invention may be embodied, expressly reserving our right to the various modifications that can be made without departing from the spirit thereof, what we claim is:

1. The combination with an aerial vessel of a plurality of flexible planes and a tubular propelling apparatus, the planes being so disposed about the propelling apparatus that they may be inflated or deflated to a convex or concave form as desired.

2. The combination with an aerial vessel of a tubular propelling apparatus having enlarged triangular ends and a system of aero planes adapted to form an inclosed space about the said propelling apparatus for the purpose described.

3. The combination with an aerial vessel of a tubular propelling apparatus with enlarged triangular ends and three inclosing planes to form an inclosed space about the said propelling apparatus, one of the planes being secured in a normally horizontal position above the propelling apparatus.

4. The combination with an aerial vessel of a tubular propelling apparatus with enlarged triangular ends and three inclosing planes to form an inclosed space about the said propelling apparatus, one of the planes being secured in a normally horizontal position above the propelling apparatus, and other planes secured at the lateral edges of said horizontal plane above the propelling apparatus.

5. The combination with an aerial vessel of a tubular propelling appartus having enlarged triangular ends, three inclosing planes attached to the said triangular ends and inclosing the propelling apparatus, and means within said apparatus for producing an air current therethrough.

6. The combination with an aerial vessel of a tubular propelling apparatus having enlarged triangular ends, three inclosing planes attached to the said triangular ends and inclosing the propelling apparatus, and means within said apparatus for discharging rearwardly a heated elastic fluid under pressure.

7. In an aerial vessel the combination with planes or air-impinging surfaces of an inclosing casing for a buoyant element, and means for inflating the casing with a heated gas or other elastic fluid supplied under pressure and mingled with a relatively large quantity of atmospheric air.

8. In an aerial vessel the combination with planes or air-impinging surfaces of an inclosing casing for a buoyant element, a generator for producing heated gas or other elastic fluid under pressure and means for conducting said heated gas or other elastic fluid to the interior of the casing in such manner as to draw with it a relatively large quantity of atmospheric air, said air being heated by the said gas or elastic fluid.

9. In an aerial vessel the combination with planes or air-impinging surfaces of an inclosing casing for a buoyant element, a centrally contracted conduit or passage leading to the interior of said casing, and a nozzle within the conduit adapted to discharge a jet of heated elastic fluid into the casing so as to draw with it a relatively large quantity of atmospheric air.

10. In an aerial vessel the combination with planes or air-impinging surfaces of an inclosing casing for a buoyant element, a generator for producing heated gas or other elastic fluid, and means for discharging a jet of said heated gas outwardly through an aperture in said casing in such manner as to expel its contents therethrough.

11. In an aerial vessel the combination with planes or air-impinging surfaces of an inclosing casing for a buoyant element, a generator for producing heated gas or other elastic fluid, means for discharging a jet of said heated gas outwardly through an aperture in said casing in such manner as to expel its contents therethrough and means for opening and closing the aperture in the casing.

12. In an aerial vessel the combination with planes or air-impinging surfaces of an inclosing casing forming an envelop for a buoyant element, and means for discharging a jet of heated fluid upward through an opening in the lower part of said envelop so as to heat the contents thereof, the surplus contents of said envelop being displaced through said opening in its lower part.

13. In an aerial vessel the combination with planes or air-impinging surfaces of an inclosing casing for a buoyant element, a centrally contracted conduit or passage communicating with the interior of said casing, and a nozzle within said conduit adapted to discharge a heated gas or other elastic fluid outwardly through said conduit in such manner as to expel the contents of the casing therethrough.

14. In an aerial vessel the combination with planes or air-impinging surfaces of an inclosing casing for a buoyant element, a centrally contracted conduit or passage communicating with the interior of said casing, a nozzle within said conduit adapted to discharge a heated gas or other elastic fluid outwardly through said conduit in such manner as to expel the contents of the casing therethrough, and means for opening and closing said conduit.

15. In an aerial vessel the combination with planes or air-impinging surfaces of an inclosing casing forming an envelop for a buoyant element and means for conducting a jet of elastic fluid in either direction through an aperture in said casing.

16. In an aerial vessel the combination with planes or air-impinging surfaces of an inclosing casing forming an envelop for a buoyant element, means for conducting a jet of elastic fluid in either direction through an aperture in said casing and means for opening and closing said aperture.

17. In an aerial vessel the combination with planes or air-impinging surfaces of an inclosing casing for a buoyant element, a centrally contracted conduit or passage leading thereto and means for discharging a jet of gas or other elastic fluid in either direction through said conduit.

18. In an aerial vessel the combination with planes or air-impinging surfaces of an inclosing casing for a buoyant element, a centrally contracted conduit or passage leading thereto, means for discharging a jet of gas or other elastic fluid in either direction through the said conduit, and means for opening and closing said conduit or passage.

19. In an aerial vessel the combination with planes or air-impinging surfaces of an inclosing casing for a buoyant element, and means for inflating and deflating the casing, said means comprising a jet-nozzle casing forming an aperture in the lower portion of the casing and a nozzle or nozzles within said jet-nozzle casing adapted to discharge a jet of elastic fluid in either direction therethrough.

20. In an aerial vessel the combination with planes or air-impinging surfaces of an inclosing casing for a buoyant element, means for inflating and deflating the casing, said means comprising a jet-nozzle casing forming an aperture in the lower portion of the casing and a nozzle or nozzles within said jet-nozzle casing adapted to discharge a jet of elastic fluid in either direction therethrough, and means for opening and closing said jet-nozzle casing.

21. In an aerial vessel the combination with planes or air-impinging surfaces of an inclosing casing for a buoyant element, a centrally contracted conduit or passage leading thereto, a generator for producing heated gas or other elastic fluid under pressure, a pipe leading from the generator, a three-way cock connected to said pipe, a branch pipe from said cock adapted to discharge a jet of said gas or fluid into the casing through the said conduit in such manner as to draw atmospheric air therethrough, and another branch pipe from said cock adapted to discharge a jet of said gas or fluid in the opposite direction through the said conduit in such manner as to draw out the contents of the casing.

22. In an aerial vessel the combination with planes or air-impinging surfaces of an inclosing casing for a buoyant element, a centrally contracted conduit or passage leading thereto, a generator for producing heated gas or other elastic fluid under pressure, a pipe leading from the generator, a three-way cock connected to said pipe, a branch pipe from said cock adapted to discharge a jet of said gas or fluid into the casing through the said conduit in such manner as to draw atmospheric air therethrough, another branch pipe from said cock adapted to discharge a jet of said gas or fluid in the opposite direction through the said conduit in such manner as to draw out the contents of the casing and means for opening and closing said elongated conduit or passage.

23. The combination with an aerial vessel of a tubular balloon having a central passage and means for discharging an elastic fluid therein, the walls of said passage being formed of rigid material to withstand wind or air pressure and being extended forward of the balloon to form wind shields therefor.

24. The combination with an aerial vessel of a tubular balloon having a central passage of triangular section and means for discharging an elastic fluid therein, the walls of said passage being formed of rigid material to withstand wind or air pressure and being extended forward of the balloon to form wind shields therefor.

25. In an inflatable and deflatable airship, means for producing a heated elastic fluid under pressure, means for propelling the airship by the rearward discharge of said fluid, and means for the employment of a jet of said fluid for the inflation thereof.

26. In an inflatable and deflatable airship, means for producing a heated elastic fluid under pressure, means for propelling the airship by the rearward discharge of said fluid, and means for the employment of a jet of said fluid for the deflation thereof.

27. In an inflatable and deflatable airship, means for producing a heated elastic fluid under pressure, means for propelling the airship by the rearward discharge of said fluid, and means for the employment of jets of said fluid for the inflation and deflation thereof.

28. In an inflatable and deflatable airship, means for producing a heated elastic fluid under pressure, means for propelling the airship by the rearward discharge of said fluid, and means for the employment of a jet of said fluid for the inflation thereof, said means comprising a device for discharging a jet of said fluid into an opening in the balloon casing in such manner as to draw atmospheric air therethrough, the air being heated by said fluid.

29. In an inflatable and deflatable airship, means for producing a heated elastic fluid under pressure, means for propelling the airship by the rearward discharge of said fluid, and means for the employment of a jet of said fluid for the deflation thereof, said means comprising a device for discharging a jet of said fluid outwardly through an opening in the balloon casing in such manner as to draw out the balloon contents therethrough.

30. In an inflatable and deflatable airship, means for producing a heated elastic fluid under pressure, means for propelling the airship by the rearward discharge of said fluid, and means for the employment of jets of said fluid for the inflation and deflation thereof, said means comprising a device for discharging a jet of said fluid in either direction through an opening in the balloon casing.

31. The combination with an aerial vessel of a tubular propelling apparatus having enlarged triangular ends, a system of aeroplanes adapted to form an inclosed space about the said propelling apparatus, forward and aft horizontal rudders and means for operating said horizontal rudders as described.

32. The combination with an aerial vessel of a tubular balloon having a central passage of triangular section and means for discharging an elastic fluid therein, the walls of said passage being formed of rigid material to withstand wind or air pressure.

33. The combination with an aerial vessel of a tubular balloon having a central passage of triangular section and means for discharging an elastic fluid therein to propel the vessel.

34. The combination in an aerial vessel of an inclosing casing for a buoyant element and means for inflating the casing with a heated gas or other elastic fluid supplied under pressure and mingled with a relatively large quantity of atmospheric air.

35. The combination in an aerial vessel of an inclosing casing for a buoyant element, a generator for producing heated gas or other elastic fluid under pressure and means for conducting said heated gas or other elastic fluid to the interior of the casing in such manner as to draw with it a relatively large quantity of atmospheric air, said air being heated by the said gas or elastic fluid.

36. The combination in an aerial vessel of an inclosing casing for a buoyant element, a centrally contracted conduit or passage leading to the interior of said casing and a nozzle within the conduit adapted to discharge a jet of heated elastic fluid into the casing so as to draw with it a relatively large quantity of atmospheric air.

37. The combination in an aerial vessel of an inclosing casing forming an envelop for a buoyant element, and means for discharging a jet of heated fluid upwards through an opening in the lower part of said envelop so as to heat the contents thereof, the surplus contents of said envelop being displaced through said opening in its lower part.

38. The combination in an aerial vessel of an inclosing casing for a buoyant element, a generator for producing heated gas or other elastic fluid and means for discharging a jet of said heated gas outwardly through an aperture in said casing in such manner as to expel its contents therethrough.

39. The combination in an aerial vessel of an inclosing casing for a buoyant element, a generator for producing heated gas or other elastic fluid, means for discharging a jet of said heated gas outwardly through an aperture in said casing in such manner as to expel its contents therethrough and means for opening and closing the aperture in the casing.

40. The combination in an aerial vessel of an inclosing casing for a buoyant element, a centrally contracted conduit or passage communicating with the interior of said casing and a nozzle within said conduit adapted to discharge a heated gas or other elastic fluid outwardly through said conduit in such manner as to expel the contents of the casing therethrough.

41. The combination in an aerial vessel of an inclosing casing for a buoyant element, a centrally contracted conduit or passage communicating with the interior of said casing, a nozzle within said conduit adapted to discharge a heated gas or other elastic fluid outwardly through said conduit in such manner as to expel the contents of the casing therethrough and means for opening and closing said conduit.

42. The combination in an aerial vessel of an inclosing casing forming an envelop for a buoyant element and means for conducting a jet of elastic fluid in either direction through an aperture in said casing.

43. The combination in an aerial vessel of an inclosing casing forming an envelop for a buoyant element, means for conducting a jet of elastic fluid in either direction through an aperture in said casing and means for opening and closing said aperture.

44. The combination in an aerial vessel of an inclosing casing for a buoyant element, a centrally contracted conduit or passage leading thereto and means for discharging a jet of gas or other elastic fluid in either direction through said conduit.

45. The combination in an aerial vessel of an inclosing casing for a buoyant element, a centrally contracted conduit or passage leading thereto, means for discharging a jet of gas or other elastic fluid in either direction through said conduit and means for opening and closing said conduit or passage.

46. The combination in an aerial vessel of an inclosing casing for a buoyant element and means for inflating and deflating the casing, said means comprising a jet-nozzle casing forming an aperture in the lower portion of the casing and a nozzle or nozzles within said jet-nozzle casing adapted to discharge a jet of elastic fluid in either direction therethrough.

47. The combination in an aerial vessel of an inclosing casing for a buoyant element, means for inflating and deflating the casing, said means comprising a jet-nozzle casing forming an aperture in the lower portion of the casing and a nozzle or nozzles within said jet-nozzle casing adapted to discharge a jet of elastic fluid in either direction therethrough, and means for opening and closing said jet-nozzle casing.

48. The combination in an aerial vessel of an inclosing casing for a buoyant element, a centrally contracted conduit or passage leading thereto, a generator for producing heated gas or other elastic fluid under pressure, a pipe leading from the generator, a three-way cock connected to said pipe, a branch pipe from said cock adapted to discharge a jet of said gas or fluid into the casing through the said conduit in such manner as to draw atmospheric air therethrough and another branch pipe from said cock adapted to discharge a jet of said gas or fluid in the opposite direction through the said conduit in such manner as to draw out the contents of the casing.

49. The combination in an aerial vessel of an inclosing casing for a buoyant element, a centrally contracted conduit or passage leading thereto, a generator for producing heated gas or other elastic fluid under pressure, a pipe leading from the generator, a three-way cock connected to said pipe, a branch pipe from said cock adapted to discharge a jet of said gas or fluid into the casing through the said conduit in such manner as to draw atmospheric air therethrough, another branch pipe from said cock adapted to discharge a jet of said gas or fluid in the opposite direction through the said conduit in such manner as to draw out the contents of the casing and means for opening and closing said conduit or passage.

CHRISTOPHER JOHN LAKE,
(FORMERLY JOHN CHRISTOPHER LAKE).
SPENCER HEATH.

Witnesses:
C. E. ADAMS,
N. P. McKNEW.